United States Patent
Heise

(10) Patent No.: US 7,085,372 B1
(45) Date of Patent: Aug. 1, 2006

(54) METHOD AND DEVICE FOR TRANSMITTING A TRANSMISSION SIGNAL VIA A TWO-CORE LINE

(75) Inventor: Bernd Heise, München (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/958,500

(22) PCT Filed: Apr. 3, 2000

(86) PCT No.: PCT/DE00/01158

§ 371 (c)(1),
(2), (4) Date: Oct. 10, 2001

(87) PCT Pub. No.: WO00/62439

PCT Pub. Date: Oct. 19, 2000

(30) Foreign Application Priority Data

Apr. 13, 1999  (DE) ................................ 199 16 635

(51) Int. Cl.
*H04M 1/00* (2006.01)
*H04M 9/00* (2006.01)

(52) U.S. Cl. ................ 379/399.01; 379/399.02; 379/400; 379/413.01

(58) Field of Classification Search .......... 379/399.01, 379/399.02, 400, 413.01, 22, 414, 415, 416, 379/418; 333/17.1–17.3, 19
See application file for complete search history.

(56) References Cited

U.S. PATENT DOCUMENTS

| 4,588,858 | A |   | 5/1986 | Watts et al. |
| 5,376,904 | A | * | 12/1994 | Wong ........................ 333/109 |
| 5,384,854 | A | * | 1/1995 | Downs et al. ................ 381/81 |
| 5,696,777 | A |   | 12/1997 | Hofsaess |
| 5,943,177 | A | * | 8/1999 | Mathews et al. ............. 360/65 |

FOREIGN PATENT DOCUMENTS

DE  43 43 950 A1  6/1995
DE  42 05 241 C2  12/1997

OTHER PUBLICATIONS

B. Roessler et al., *Journal of Solid-State Circuits*, 23(2):311-317 (1988).
English Translation of PCT International Preliminary Examination Report, dated Mar. 27, 2001, 5 pgs.

* cited by examiner

*Primary Examiner*—Quoc Tran
(74) *Attorney, Agent, or Firm*—Peter F. Corless; Steven M. Jensen; Edwards Angell Palmer & Dodge, LLP

(57) ABSTRACT

Method and apparatus for transmitting a transmission signal via a two-core line, in particular a telephone line, in which case, with the aid of corresponding transmission devices (2, 3), two partial signals are generated and are transmitted via a respective core (A, B) of the line and the transmission signal is formed by the alternating-current difference between the two partial signals. In order to suppress common-mode components in the partial signals, a calibration is carried out in such a way that the transmission devices (2, 3) output essentially the same output level.

20 Claims, 1 Drawing Sheet

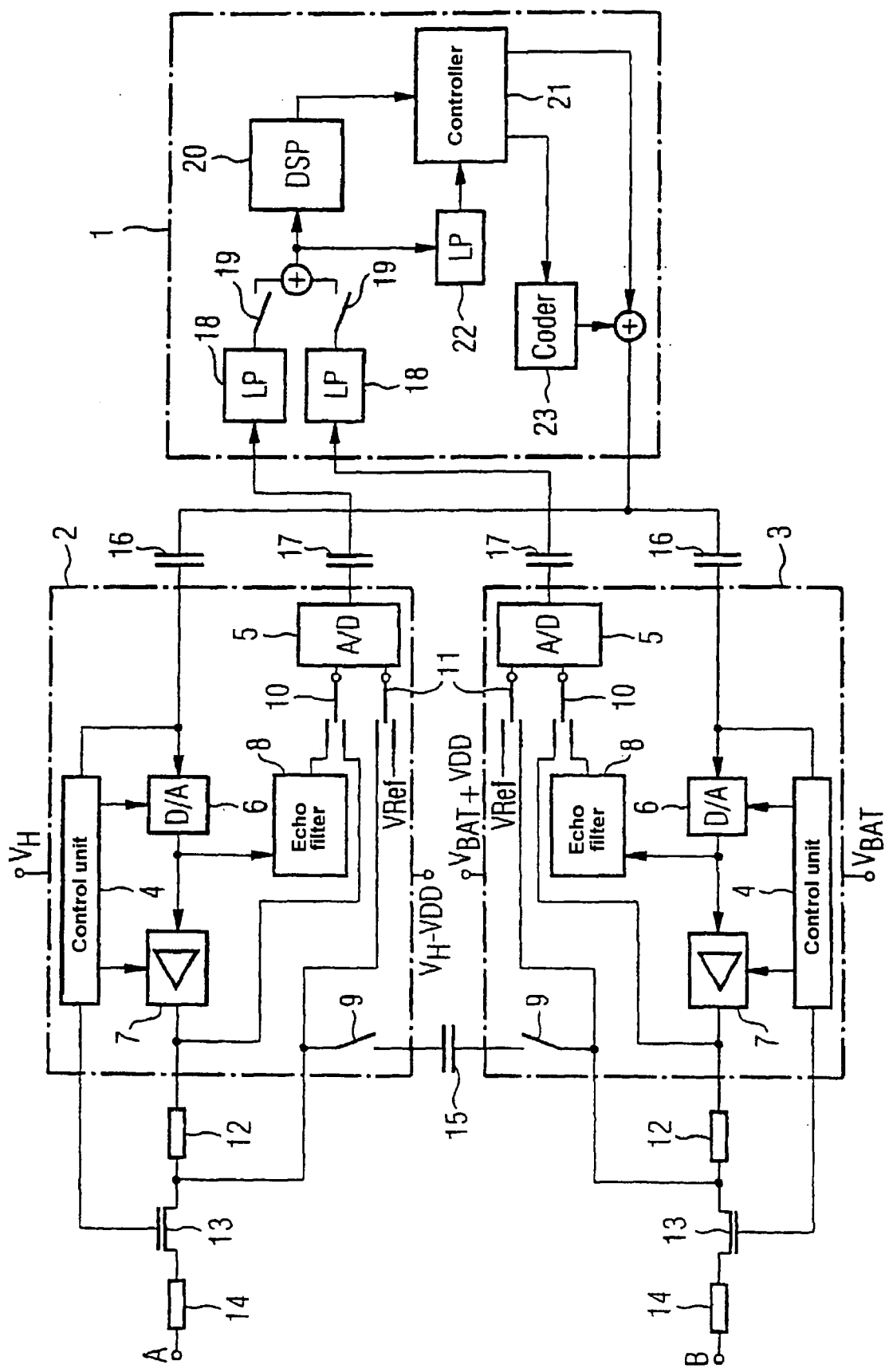

METHOD AND DEVICE FOR TRANSMITTING A TRANSMISSION SIGNAL VIA A TWO-CORE LINE

The present invention relates to a method and an apparatus for transmitting a transmission signal via a two-core line, in particular via a two-core telephone line, according to the preamble of claim 1 and according to the preamble of claim 8, respectively.

In order to transmit a transmission signal via a telephone subscriber loop, referred to as telephone line below for the sake of simplicity, or in order to receive a reception signal from the telephone line, a transformerless circuit arrangement is known which essentially has two identically constructed transmission and reception devices and also a control device which drives the transmission and reception devices. Each of these modules is configured, in particular, as a separate chip. With the aid of the transmission and reception devices, on the one hand transmission signals are impressed on the telephone line and on the other hand reception signals are coupled out. Each transmission and reception device is connected to a line core of the telephone line. The two transmission and reception devices are operated with different supply voltages. The control device drives the two transmission and reception devices in such a way that desired transmission signals are sent from the transmission and reception devices via the telephone line. In this case, each transmission and reception device generates a partial signal of the desired transmission signal, the transmission signal being formed by the alternating-current difference between the two partial signals, which is achieved by corresponding driving of the two transmission and reception devices by the central control device.

The above-described circuit arrangement of the generic type is suitable in particular for connection to ISDN telephone lines (Integrated Services Digital Network).

The two transmission and reception devices drive the transmission line cores connected to them via a series resistor, the two series resistors simulating the impedance of the transmission line and having the same values.

International standards require limitation of the common-mode components of the transmission signal for reasons of electromagnetic radiation. Thus, for example, in the publication ETSI Technical Report ETR 080, September 1995, European Telecommunications Standards Institute, Sophia-Antipolis, France, a test circuit for monitoring the longitudinal component of the transmission signal is defined, in which case the longitudinal component of the transmission signal in the frequency range of 100 Hz to 150 kHz averaged over in each case a time period of 1 s is only permitted to have a voltage root-mean-square value of less than −50 dBV.

Ideally, the partial signals transmitted via the two cores should have identical magnitudes, but be opposite to one another.

In order to be able to satisfy the above mentioned requirements, the resistances of the series resistors connected to the outputs of the two transmission and reception devices are permitted to deviate by not more than 2.5% given an exactly identical output level. On the other hand, the output levels are permitted to deviate by not more than 0.5% given exactly identical circuitry, i.e. given exactly identical resistances of the series resistors. However, this cannot be realized with a tenable outlay in semiconductor circuits.

In earlier circuits, common-mode components were suppressed by using a transformer. Equally, there are known solutions for circuits in which the signals are jointly generated on a module, i.e. on a chip, in which case the output signals can be tuned by virtue of a corresponding symmetrical design of the circuit.

However, there is still no known solution for circuits of the type described in the introduction in which the partial signals are generated on separate chips.

The present invention is therefore based on the object of providing a method and a transformerless apparatus for transmitting a transmission signal via a two-core line, in particular a two-core telephone line, it being possible to suppress common-mode components in the transmission signal. In particular, the intention is for the invention also to be applicable to circuits in which the transmission signal is generated by two separate modules, i.e. on separate chips.

The abovementioned object is achieved according to the invention by means of a method having the features of claim 1 and an apparatus having the features of claim 8. The subclaims each describe preferred and advantageous embodiments of the present invention.

According to the invention, a calibration of the transmission devices which generate the partial signals is carried out in such a way that their outputs which are in each case connected to a core of the transmission line are calibrated with one another in order to match their output levels to one another.

In this case, the calibration may proceed in two steps. During a first step, the production-dictated relative deviation between the different conversion or converter ratios of the analog/digital converters contained in each module or chip is implemented in order to be able to subsequently take it into account in the actual calibration. During a second step, using the analog/digital converters, the individual output levels are then measured, compared with one another and adjusted in such a way that they correspond within the limits of the measurement accuracy.

For this purpose, in particular after the comparison of the output levels, a correction value can be fed to one of the two modules, which correction value is subsequently used in the corresponding module for correcting a reference voltage used for generating the output level of the corresponding partial signal.

In order to further improve the correspondence of the output levels, the previously described calibration can be carried out repeatedly.

Thus, the present invention enables alternating-current calibration of the output levels output by the two modules, even though, in voltage terms, said output levels are at completely different potentials, there being no need for a direct-current flow via this high potential difference for this purpose.

The invention is particularly suitable for use on ISDN telephone lines (Integrated Services Digital Network). However, the invention can generally be used wherever a high remote feeding voltage is intended to be applied to a transmission or copper line and at the same time, without using a transformer, transmission signals are intended to be passed onto the transmission line and the partial signals flowing via the two cores of the transmission line are intended, with high accuracy, indeed to have the same magnitude but be the inverse of one another. This applies, for example, to the following signal transmission methods: 2B1Q coding, 4B3T coding, Up0, MDSL (Multirate Digital Subscriber Line), HDSL (High Bit Rate Digital Subscriber Line), SDSL (Single Pair Of Symmetric Digital Subscriber Line), VDSL (Very High Bit Rate Digital Subscriber Line) and ADSL (Asynchronous Digital Subscriber Line).

The present invention is explained below using a preferred exemplary embodiment with reference to the single FIGURE, in which FIG. 1 shows a schematic block diagram of this preferred exemplary embodiment of an apparatus according to the invention.

The apparatus shown in FIG. 1 comprises two transmission and reception devices 2 and 3, which are configured as separate chip modules, and also a control device 1 for driving the two transmission and reception devices 2, 3.

The two transmission and reception devices are at different voltage levels. The transmission and reception device 2 has supply voltage connections $V_H$ and $V_H$-VDD, while the transmission and reception device 3 has supply voltage connections $V_{BAT}$+VDD and $V_{BAT}$. The voltage difference present across the transmission and reception devices 2 and 3 is in both cases VDD, where VDD is up to 6 V and thus lies in the region of customary supply voltages for CMOS semiconductor devices. The voltage difference between $V_H$ and $V_{BAT}$ is about 110 V. Each transmission and reception device 2, 3 has an output buffer or output driver 7, which will be explained in more detail below and via which transmission signals are in each case fed onto a corresponding line core of a transmission line. In this case, the output buffer 7 of the transmission and reception device 2 outputs a voltage between $V_H$ and $V_H$-VDD, and the output buffer 7 of the transmission and reception device 3 outputs a voltage between $V_{BAT}$+VDD and $V_{BAT}$, so that between the output connections of the output buffers 2 and 3 there is always a voltage which is not more than $V_H$-$V_{BAT}$ and not less than $V_H$-$V_{BAT}$-2VDD.

The requirements imposed on the feeding of a telephone subscriber loop can be met given appropriate dimensioning of $V_H$, $V_{BAT}$ and VDD.

On the output side, each of the two transmission and reception devices 2, 3 is connected via a first resistor 12, a field-effect transistor 13 and a second resistor 14 to a connection A or B, respectively, which is assigned to a corresponding core of a two-core transmission line or telephone subscriber loop. On the one hand, the transmission and reception devices 2, 3 in each case output received signals, which are directed from the line cores A, B to the corresponding line termination circuit, via an analog/digital converter 5 to the control device 1. Each transmission and reception device 2, 3 furthermore has an echo filter 8 for echo attenuation of the signals received via the respective line core A, B. In the opposite direction, the transmission and reception devices 2, 3 receive from the control device 1 digital signals which are coupled into the corresponding core of the telephone or transmission line via a digital/analog converter 6 and the output buffer 7 already mentioned. The output buffers 7 of the transmission and reception devices 2 and 3 work in opposite senses in push-pull operation. The partial signals received by the transmission and reception devices 2, 3 form the reception signal received by the transmission line, and the partial signals impressed on the corresponding line core A, B by the transmission and reception devices 2, 3 form the transmission signal to be transmitted via the transmission line, the transmission signal being formed, in particular, by the alternating-current difference between the transmitted partial signals of the two transmission and reception devices 2, 3.

The lines assigned to the above-described input and output signals of the transmission and reception devices 2, 3 are connected via capacitors 16 and 17, respectively, to the control device 1, which is configured in the form of a digital circuit. Signals received by the transmission and reception devices 2, 3 are fed, after the analog/digital conversion by the analog/digital converter 5, via the capacitor 17 and a low-pass filter (LP) 18 and also controllable switches 19 to a summation element, whose output is connected to a digital signal processor (DSP) 20 and, via a further digital low-pass filter 22, to an input/output control unit 21. By contrast, digital transmission signals are fed to the transmission and reception devices 2, 3 via the capacitors 16. The capacitors 16, 17 provided between the transmission and reception devices 2, 3 and the control device 1 serve as direct electrical isolation elements.

In addition to the elements described above, the control device 1 also comprises a line coder 23 and a summation element connected to the outputs of the line coder 23 and of the input/output control unit 21. The input/output control unit 21 transfers to the line coder 23 a signal to be transmitted, said line coder subjecting said signal for example to 2B1Q coding (i.e. 2 bits produce a quaternary symbol). Furthermore, the input/output control unit 21 feeds to the summation element a signal by means of which the operating points of the components of the transmission and reception devices 2, 3 can be regulated.

In the present exemplary embodiment, the input/output control unit 21 is configured in such a way that, in particular after every reset in the context of the sequence control present, it automatically carries out a calibration of the transmission and reception devices 2, 3 in order to calibrate their outputs—connected to the line cores A, B—with one another. The actual purpose of this calibration is to obtain output levels of the two transmission and reception devices 2, 3 which largely correspond within the limits of the measurement accuracy.

Therefore, in the context of calibration, the output levels of the two transmission and reception devices 2, 3 are measured, compared with one another and, depending on the comparison result, subsequently adjusted in such a way that they essentially correspond. In this case, the output levels are measured by means of the analog/digital converters 5 of the two transmission and reception devices 2, 3, which, however, due to the dictates of production, may have different conversion ratios. Therefore, before the actual output level measurement, it is preferable firstly to determine the relative difference between the conversion ratios of the analog/digital converters 5 provided in the transmission and reception devices 2, 3 in order that a deviation thus ascertained can subsequently be taken into account in the evaluation of the output levels, since such deviations of the conversion ratios can corrupt the output level measured values yielded.

Therefore, the calibration is preferably effected in two steps.

In a first step, the different conversion ratios—due to the dictates of production—of the analog/digital converters are determined in each chip or in each transmission and reception device 2, 3 with high relative accuracy.

For this purpose, the input/output control unit 21 transmits via the serial interface a corresponding control information item to the two transmission and reception devices 2, 3, which is evaluated by decentralized control units 4 contained in the transmission and reception devices 2, 3 and is converted into a turn-off signal for the transistors 13 provided on the output side. In this way, the transistors are switched to have high impedance at the beginning of calibration, with the result that the transmission and reception devices 2, 3 are isolated from the line cores A, B in order to preclude external influences. The two transistors are field-effect transistors which are present anyway for protection reasons.

A resistor 12, which has already been mentioned above, is in each case connected between the output of the transmission and reception device 2 or 3 and the corresponding external transistor 13, a very high production accuracy of, for example, 0.1% being demanded of said resistor. On the input side, the analog/digital converters 5 contained in the transmission and reception devices 2, 3 can be connected via controllable switches 10, 11, which may be formed by transistors, to the two ends of the corresponding resistor 12 or a reference voltage $V_{REF}$. The controllable switches 10, 11 are driven by the corresponding control unit 4 in combination with the central control device 1.

For calibration, the controllable switches 10, 11 are switched in such a way that the voltage dropped across the corresponding resistor 12 is fed to each analog/digital converter 5. By means of further controllable switches 9, those ends of the resistors 12 which are connected to the external transistors 13 are connected via a capacitance 15 in terms of alternating current. In other words, an alternating-current connection is present between the outputs of the two transmission devices 2, 3 to which an AC signal is applied by the input/output control unit 21 of the control device 1 during calibration. The circuit blocks shown in FIG. 1 may be designed in particular such that a plurality of core pairs A, B, for example four core pairs, can be jointly calibrated with the aid of the capacitor 15. In this case, the individual transmission and reception devices 2, 3 must be connected to the capacitor 15 in a time division multiplexed manner for calibration via the controllable switches 9.

In the course of the circuit development, care must be taken to ensure that exactly an identical current not corrupted by leakage resistances or leakage capacitances flows through the series resistors 12. If the same current flows through the two series resistors 12, the same voltage is dropped across them as well (within a specific tolerance range). Therefore, the voltage drop across the resistors 12 is fed via the switches 10, 11 to the analog/digital converters 5, digitized and fed via the low-pass filters 18 and further controllable switches 19 to the digital signal processor 20 of the control device 1 for evaluation. The controllable switches 19 are driven by the input/output control unit 21 of the control device 1 in such a way that the digital signal processor 20 can compare the measured and digitized voltage amplitudes in order to determine the relative difference between the conversion ratios of the two analog/digital converters 5. If the digital signal processor 20 has detected a relative deviation between the conversion ratios, said deviation is stored, so that all the digital measured values of the analog/digital converters 5 can subsequently be corrected by the relation that has been determined or by the relative deviation of the conversion ratios that has been determined. Since the linearity and the relative resolution of the analog/digital converters 5 are 70 dB (12 bits), after this step the output levels or the voltages dropped across the output resistors 12 can be measured and compared up to the accuracy of the output resistors 12, with the result that a highly accurate calibration is possible.

After this first step, the actual calibration is effected in a second step. For this purpose, during this second step, using the analog/digital converters 5, the voltages dropped across the resistors 12 are measured and, consequently, the output levels of the two transmission and reception devices 2 are detected. These measured values, too, are fed via the capacitors 17, low-pass filters 18 and controllable switches 19 to the digital signal processor 20 and the input/output control unit 21 of the control device 1. The measurement results are once again evaluated by the digital signal processor 20, so that, depending on the comparison result, a correction value for correcting the corresponding output levels can be fed to the two transmission and reception devices 2, 3 via the serial interface. This correction value is stored by the corresponding control unit 4 and applied to the output buffer 7, provided in the signal path of the corresponding transmission and reception device, in order thus in each case to match the reference voltage for the amplification of the corresponding output signal of the transmission and reception device 2 or 3, so that, within the limits of the measurement tolerance, identical output levels of the two transmission and reception devices 2, 3 are obtained as a result.

In order to further improve the correspondence of the output levels, in particular the second step can be performed repeatedly.

The invention claimed is:

1. A method for transmitting a transmission signal via a two-core line,
    in which case, with the aid of corresponding transmission devices, two partial signals are generated and are transmitted via a respective core of the line, and
    in which case the transmission signal is formed by the alternating-current difference between the two partial signals,
    wherein a calibration of output levels occurring at those connections of the transmission devices which are connected to the cores of the line in relation to one another is carried out such that the output levels of the connections are measured, compared and set in such a way that they essentially correspond,
    in that, after the calibration of the output levels of the transmission devices, the transmission signal is transmitted via the cores of the line, and
    wherein, after the measurement and comparison of the output levels of those connections of the two transmission devices which are connected to the two cores, depending on the comparison result, an output level correction value is generated and taken into account in a corresponding one of the transmission devices during the subsequent transmission of the corresponding partial signal.

2. The method as claimed in claim 1, wherein, for calibration, the connections are separated from the corresponding core of the line.

3. The method as claimed in claim 2, wherein, the output levels of the connections are in each case measured by analog-to-digital conversion, and
    in that, before the measurement of the output levels of the connections, a relative difference between the two analog-to-digital conversions is detected and taken into account in the subsequent measurement of the output levels.

4. The method as claimed in claim 2, wherein, the output levels of the connections are measured by detecting the voltage drop across a resistor connected in series with the respective connection.

5. The method as claimed in claim 1, wherein, each partial signal is amplified in the corresponding transmission device before transmission via the corresponding core of the line, and
    in that the output level correction value is used as correction value for the reference voltage in the amplification of the corresponding partial signal.

6. The method as claimed in claim 2, wherein, after the calibration has been carried out, a renewed calibration is carried out in order to further improve the correspondence of the output levels of the connections.

7. An apparatus for transmitting a transmission signal via a two-core line, comprising:
a first transmission device for transmitting a first partial signal via a first core of the line,
having a second transmission device for transmitting a second partial signal via a second core of the line, and
having a control device for driving the first and second transmission devices in such a way that a desired transmission signal is transmitted in the form of the alternating-current difference between the two partial signals via the line,
wherein a level detector for measuring output levels of the transmission devices are provided, and
in that the control device is configured in such a way that it compares the output levels—measured by the level detection means of the two transmission devices with one another and, depending on the comparison result, generates control signals for calibrating the transmission devices in such a way that essentially the same output level is output by the transmission devices.

8. The apparatus as claimed in claim 7, wherein the level detector comprises resistors, a resistor being connected in series in each case between an output connection of the transmission devices and the corresponding core of the line and, in order to measure the output levels, the voltage dropped across the individual resistors is detected.

9. The apparatus as claimed in claim 7, wherein the level detector comprises, for each transmission device, an analog/digital converter, via which the corresponding output level is fed to the control device.

10. The apparatus as claimed in claim 9, wherein the control device is configured in such a way that, before the calibration of the transmission devices, it ascertains the relative difference between the conversion ratios of the analog/digital converters assigned to the individual transmission devices, in order to use said difference as a basis for the subsequent calibration.

11. The apparatus as claimed in claim 10, wherein a capacitor is provided, via which the control device for ascertaining the relative difference between the conversion ratios of the analog/digital converters connects, in terms of alternating current, those connections of the resistors which are not connected to the output connection of the corresponding transmission device, with application of an AC signal to the output connections of the transmission devices, in order to compare the voltage dropped across the individual resistors in this state.

12. The apparatus as claimed in claim 11, wherein the control device is configured in such a way that, during the subsequent measurement of the output levels, it corrects measured values fed in by the analog/digital converters by the relative difference ascertained between the conversion ratios of the analog/digital converters.

13. The apparatus as claimed in claim 8, wherein a transistor is in each case connected between the output connection of a transmission device and the corresponding core of the line, via which transistor the control device, for calibration, separates the transmission devices from the cores of the line.

14. The apparatus as claimed in claim 7, wherein the control device is configured in such a way that, depending on the comparison result between the output levels measured by the level detector, it generates the control signals for calibrating the transmission devices in the form of a correction value which is fed from the control device for correcting the output level to one of the transmission devices.

15. The apparatus as claimed in claim 14, wherein each transmission device has an amplifier for amplifying the corresponding partial signal, and
in that each transmission device has storage means for storing the correction value fed by the control device, the control device feeding the collection value to the amplifier for the purpose of correcting a reference voltage value of the amplifier.

16. The apparatus as claimed in claim 7, wherein the two transmission devices are arranged on separate chips.

17. The use of an apparatus as claimed in claim 7 for transmitting a transmission signal via a telephone line.

18. The use as claimed in claim 17, wherein the telephone line is an JSDN telephone line.

19. A method for transmitting a transmission signal via a telephone line, comprising using an apparatus of claim 7.

20. The method of claim 19 wherein the telephone line is an ISDN telephone line.

* * * * *

UNITED STATES PATENT AND TRADEMARK OFFICE
CERTIFICATE OF CORRECTION

PATENT NO. : 7,085,372 B1  
APPLICATION NO. : 09/958500  
DATED : August 1, 2006  
INVENTOR(S) : Bernd Heise Page 1 of 1

It is certified that error appears in the above-identified patent and that said Letters Patent is hereby corrected as shown below:

On the cover Page, item [22]

PCT Filed: "Apr. 3, 2000" should read --Apr. 13, 2000--.

Signed and Sealed this

Twenty-eighth Day of November, 2006

JON W. DUDAS  
*Director of the United States Patent and Trademark Office*